United States Patent
Colannino et al.

(10) Patent No.: US 9,427,702 B2
(45) Date of Patent: Aug. 30, 2016

(54) ELECTRIC REAGENT LAUNCHER FOR REDUCTION OF NITROGEN

(71) Applicant: ClearSign Combustion Corporation, Seattle, WA (US)

(72) Inventors: Joseph Colannino, Bellevue, WA (US); David B. Goodson, Seattle, WA (US); Igor A. Krichtafovitch, Kirkland, WA (US); Roberto Ruiz, Seattle, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 0 days.

(21) Appl. No.: 14/534,845

(22) Filed: Nov. 6, 2014

(65) Prior Publication Data
US 2015/0064086 A1   Mar. 5, 2015

Related U.S. Application Data

(63) Continuation of application No. 13/963,223, filed on Aug. 9, 2013, now Pat. No. 8,911,699.

(60) Provisional application No. 61/683,177, filed on Aug. 14, 2012.

(51) Int. Cl.
| | |
|---|---|
| *B01D 53/56* | (2006.01) |
| *B01D 53/86* | (2006.01) |
| *B01D 53/90* | (2006.01) |
| *F01N 3/08* | (2006.01) |
| *F23N 5/00* | (2006.01) |
| *F23J 7/00* | (2006.01) |
| *F23J 15/02* | (2006.01) |
| *B01D 53/34* | (2006.01) |

(52) U.S. Cl.
CPC . *F23J 2219/201* (2013.01); *F23N 2900/05003* (2013.01); *Y10S 423/10* (2013.01) *B01D 53/56* (2013.01); *B01D 53/346* (2013.01); *B01D 53/8625* (2013.01); *B01D 53/8631* (2013.01); *B01D 53/90* (2013.01); *F01N 3/0892* (2013.01); *F23J 7/00* (2013.01); *F23J 15/02* (2013.01); *F23N 5/00* (2013.01); *F23N 5/003* (2013.01); *B01D 2251/206* (2013.01); *B01D 2251/2062* (2013.01); *B01D 2251/2067* (2013.01); *B01D 2257/404* (2013.01); *B01D 2258/0283* (2013.01); *F23J 2215/10* (2013.01);
(Continued)

(58) Field of Classification Search
CPC ............ B01D 53/346; B01D 53/8631; B01D 2251/206; B01D 2257/404; B01D 53/56; B01D 53/8625; B01D 53/90; B01D 2251/2062; F23J 15/02; F23J 2215/10; F23J 2219/201; Y10S 423/10
See application file for complete search history.

(56) References Cited

U.S. PATENT DOCUMENTS

| | | | | |
|---|---|---|---|---|
| 4,585,631 A | * | 4/1986 | Pfeiffer | B10D 53/56 204/157.3 |
| 5,300,270 A | * | 4/1994 | Krigmont | B01D 53/323 423/235 |

(Continued)

FOREIGN PATENT DOCUMENTS

CN          101171070 B   * 10/2012   ............. B01D 53/32
(Continued)

*Primary Examiner* — Timothy Vanoy
(74) *Attorney, Agent, or Firm* — Christopher A. Wiklof; Nicholas S. Bromer; Launchpad IP, Inc.

(57) ABSTRACT

A selective catalytic reduction system (SCR) or selective non-catalytic reduction (SNCR) system include a reagent charging apparatus configured to apply one or more electrical charges to a NOx reducing reagent. The electrical charges enhance mixing of the reagent with fluids carrying NOx and/or enhance reactivity of the reagent with NOx.

72 Claims, 7 Drawing Sheets

(56) References Cited

U.S. PATENT DOCUMENTS 6,015,483 A * 1/2000 Plog ............... B01D 53/326
 204/265
8,911,699 B2 * 12/2014 Colannino ........ B01D 53/346
 422/168

FOREIGN PATENT DOCUMENTS

| JP | 60-216111 | 10/1985 |
| JP | 61-265404 | 11/1986 |
| JP | 2001-021110 | 1/2001 |
| WO | WO 96/01394 | 1/1996 |

* cited by examiner

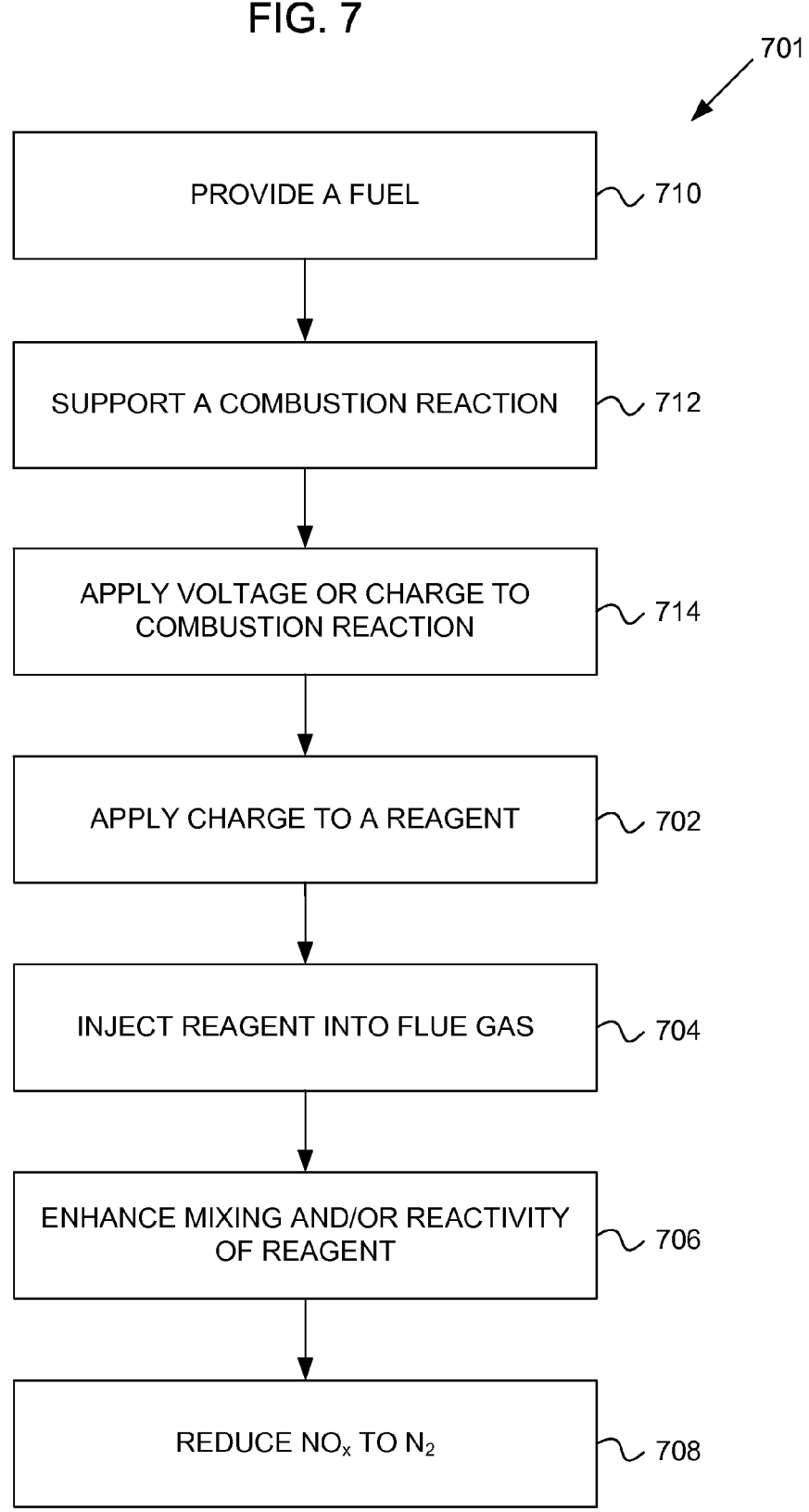

ELECTRIC REAGENT LAUNCHER FOR REDUCTION OF NITROGEN

CROSS-REFERENCE TO RELATED APPLICATIONS

The present application is a Continuation of U.S. patent application Ser. No. 13/963,223, entitled "CHARGE-INDUCED SELECTIVE REDUCTION OF NITROGEN", filed Aug. 9, 2013, now pending; which application claims priority benefit under 35 USC §119(e) to U.S. Provisional Application Ser. No. 61/683,177; entitled "CHARGE-INDUCED SELECTIVE NON-CATALYTIC REDUCTION (SNCR) OF NITROGEN", filed Aug. 14, 2012; each of which, to the extent not inconsistent with the disclosure herein, is incorporated herein by reference.

BACKGROUND

Oxides of nitrogen (NOx) are undesirable byproducts of combustion of a fuel in air. Some fuels, such as coal and biomass provide additional nitrogen and can be more problematic. Unfortunately, combustion of inexpensive fuels such as coal, biomass, and waste may tend to produce the most NOx. Regulations and general concerns for air quality have caused manufacturers and operators of combustion systems to seek ways to decrease emissions of NOx from combustion processes.

One approach to decrease the output of thermal NOx is to decrease peak-combustion reaction temperature. Another approach to decrease the output of NOx is to convert NOx present in post-combustion gases into molecular nitrogen, $N_2$. Since NOx is an oxidized form of nitrogen, conversion of NOx to $N_2$ is referred to as nitrogen reduction. Selective nitrogen reduction processes including selective catalytic reduction (SCR) and selective non-catalytic reduction (SNCR) are used to chemically reduce oxides of nitrogen (NOx) to molecular nitrogen, $N_2$.

NOx typically includes NO and $NO_2$, but at high temperatures is usually dominated by NO. In SNCR, a nitrogen compound such as ammonia ($NH_3$), urea ($NH_2CONH_2$), or another reagent is injected into hot (but not too hot) combustion fluids, such as in a firebox or boiler. If urea is injected, it reacts to form ammonia according to reaction (1):

$$NH_2CONH_2 + \tfrac{1}{2}O_2 \rightarrow 2\,NH_3 + CO_2 \qquad (1)$$
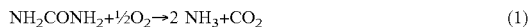

The nitrogen reduction reaction may be expressed as:

$$4NO + 4NH_3 + O_2 \rightarrow 4N_2 + 6H_2O \qquad (2)$$

The mechanism for reaction (2) involves the formation of intermediate $.NH_2$ radicals that react with NO to form the reaction products $N_2$ and $H_2O$.

One complication with the chemistries described above relates to temperature. At temperatures above 1093° C., ammonia decomposes to form NO according to reaction (3):

$$4NH_3 + 5O_2 \rightarrow 4NO + 6H_2O \qquad (3)$$

Other complications to operation of SCR/SNCR systems relate to non-uniform NOx distribution in a combustion volume or flue gas and delivery of an appropriate amount of reducing agent to the NOx distribution. Since central regions of fireboxes and furnaces tend to be hotter than regions near firebox and furnace walls, more NO tends to be formed near the center. Thus, uniform distribution of $NH_3$ across a combustion volume will not result in uniform reduction in NOx. Moreover, it can be difficult to distribute $NH_3$ to areas where it is needed.

Generally, existing SCR/SNCR systems suffer from ammonia slip (passage of unreacted ammonia out a flue) and lower than theoretical efficiency (equilibrium) with respect to removal of NOx.

What is needed is a technology that can improve performance and/or reduce costs of SCR and SNCR systems.

SUMMARY

According to an embodiment, a charge-induced selective catalytic reduction (SCR) or selective non-catalytic nitrogen oxide (NOx) reduction (SNCR) system is provided. The charge-induced SCR or SNCR system includes a reagent charging apparatus configured to apply electrical charges to a reagent or a fluid carrying the reagent to produce a charged reagent. The reagent can include molecules, an aerosol, droplets, or particles, for example. The SCR or SNCR system includes a reagent launcher operatively coupled to the reagent charging apparatus. The reagent launcher is configured to launch the charged reagent proximate to a combustion reaction or flue gas produced by the combustion reaction. Opposite polarity charges carried by the combustion reaction or flue gas can attract the charged reagent toward a reaction zone. Alternatively, a counter-electrode carrying a voltage opposite in polarity from the reagent charge can attract the charged reagent toward the reaction zone.

According to an embodiment, a method for operating a nitrogen oxide (NOx) control system is provided. The method includes applying first electrical charges to an SCR or SNCR reagent and contacting the charged reagent with a combustion reaction or a flue gas from a combustion reaction. The first electrical charges are selected to enhance mixing of the SCR or SCNR reagent with NOx-carrying fluids and/or to enhance reactivity of the reagent with NOx. For example, the first electrical charges can be opposite in polarity to charges carried by the combustion reaction or flue gas. Additionally or alternatively, the first electrical charges can be opposite in polarity to a voltage carried by a counter-electrode positioned to draw the reagent across the combustion reaction or flue gas. Additionally or alternatively, the first electrical charges can be the same polarity as a voltage carried by a launching electrode positioned to repel the reagent across the combustion reaction or flue gas. The reagent reduces the NOx to molecular nitrogen ($N_2$).

BRIEF DESCRIPTION OF THE DRAWINGS

FIG. 7 is a flow diagram that outlines a method for operating a nitrogen oxide (NOx) control system, according to an embodiment.

DETAILED DESCRIPTION

Figure 1:
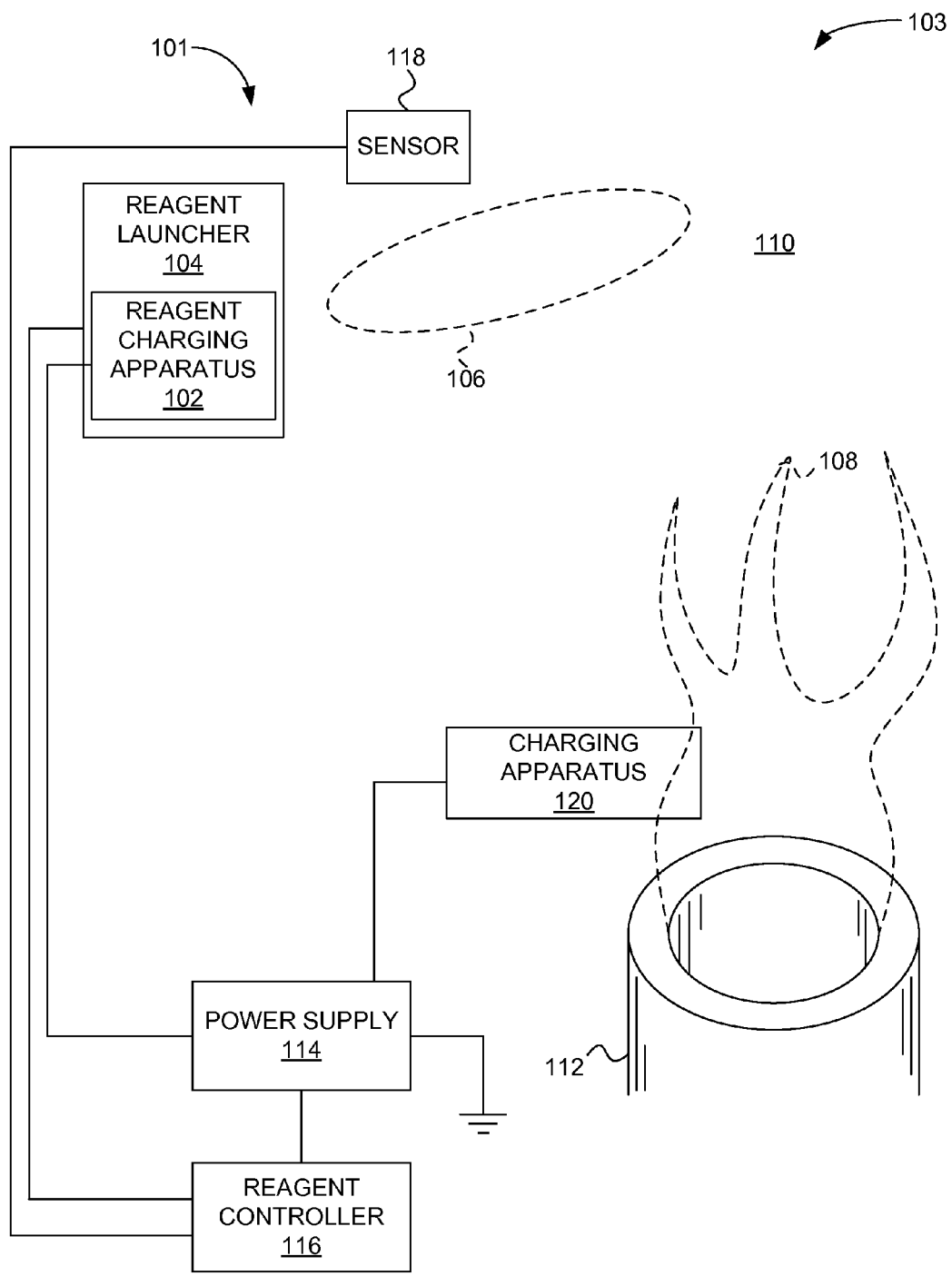
FIG. 1 is a block diagram depicting a charge-induced selective non-catalytic reduction (SNCR) system for reducing nitrogen oxides (NOx) to molecular nitrogen ($N_2$), according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

Figure 2:
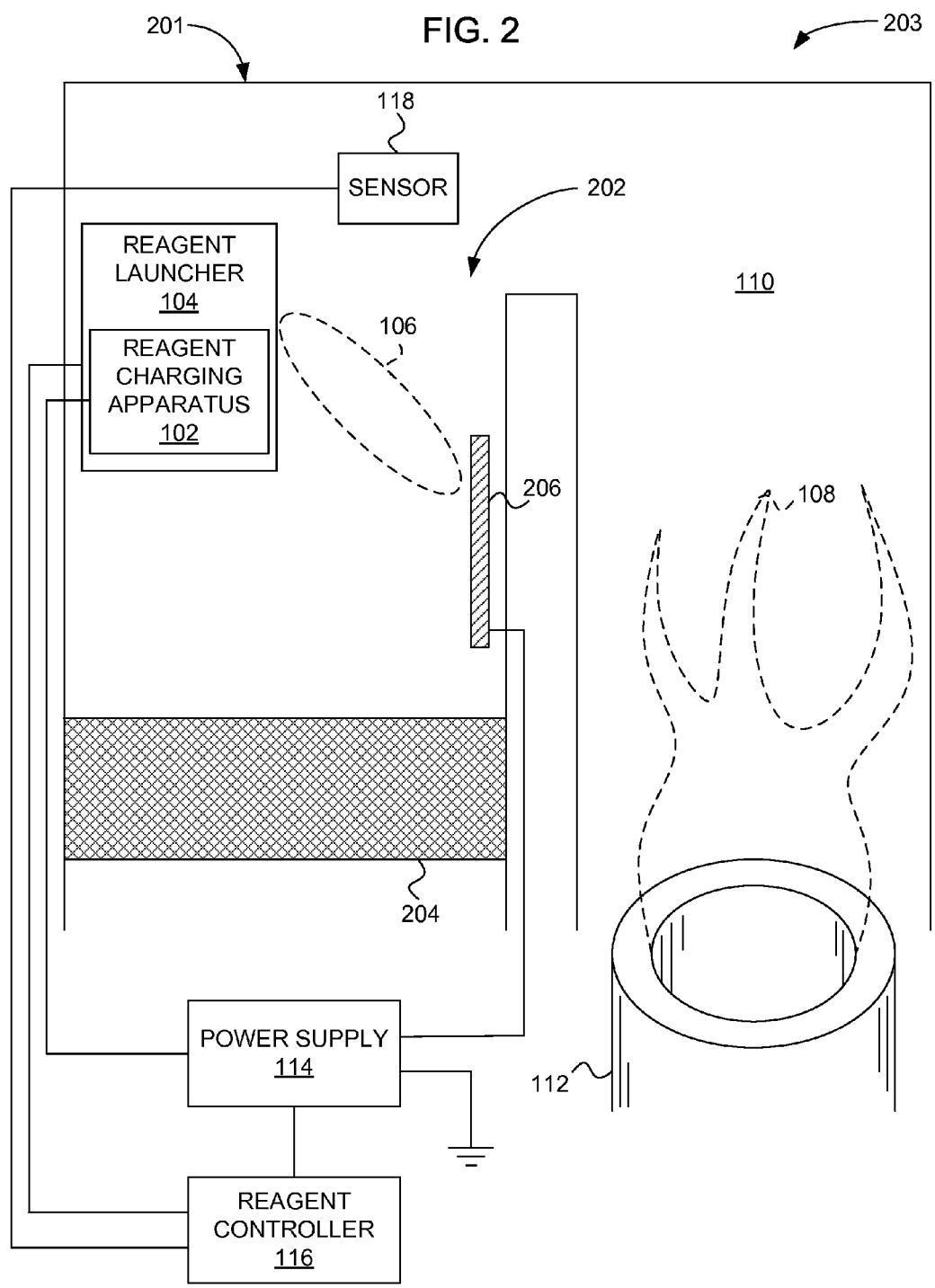
FIG. 2 is a block diagram depicting a charge-induced selective catalytic reduction (SCR) system for reducing nitrogen oxides (NOx) to molecular nitrogen ($N_2$), according to an embodiment.

FIG. 1 is a block diagram depicting a selective catalytic nitrogen oxide (NOx) reduction (SCR) system or a selective non-catalytic nitrogen oxide (NOx) reduction (SNCR) system 101, according to an embodiment. FIG. 2 is a block diagram depicting a charge-induced selective catalytic reduction (SCR) system 201 for reducing nitrogen oxides (NOx) to molecular nitrogen ($N_2$), according to an embodiment.

With reference to FIGS. 1 and 2, The SCR/SNCR systems 101, 201 include a reagent charging apparatus 102 configured to apply electrical charges to molecules, an aerosol, droplets, or particles of a reagent or a fluid carrying the reagent to produce a charged reagent 106. A reagent launcher 104 is operatively coupled to the reagent charging apparatus 102. The reagent launcher 104 is configured to launch the charged reagent 106 into a flue gas 110 produced by the combustion reaction 108. Typical reagents can include urea, cyanuric acid, aqueous ammonia, anhydrous ammonia, or coordinated ammonia reactants. Such reagents can be referred to as ammoniacal reagents. The reagent can optionally include a charge carrier mixed with the reactant. Optionally, the particular reagent can be selected to accept a particular polarity of charge. For example, a cyano group can be relatively efficient at accepting and holding a positive charge. In another example, an amine group can be relatively efficient at accepting and holding a negative charge.

The primary difference between a SCR system 201 and a SNCR 101 system is the respective presence or absence of a catalyst 204, which in turn affects a temperature window within which chemical reduction of nitrogen oxide will occur. In an SNCR embodiment, a charged reagent is injected above the combustion reaction 108 in the flue gas 110 at a location where the temperature is between about 1600° F. and 1800° F. (for an ammonia reagent) or between about 1800° F. and 2100° F. (for a urea reagent). Below the temperature window, NOx reduction may substantially not occur. At temperatures above the temperature window, the charged reagent can itself be converted to additional NOx.

In a SCR embodiment, a catalyst 204 lowers the NOx reduction temperature. The catalyst bed 204 is typically held in a reduction chamber 202. Catalysts can include ceramic carrier with an oxide of a base metal such as vanadium, molybdenum, or tungsten; or a precious metal. As depicted schematically in FIG. 2, a charge-induced SCR system 201 including the charged reagent launcher 104 is typically positioned farther away from the combustion reaction 108 such that the temperature of the flue gas 110 is further reduced compared to a charged reagent launcher 104 used in a charged-induced SNCR system 101. Other than positioning, the charge-induced SCR 201 and SNCR 101 systems can operate similarly.

According to an embodiment, the charged-induced SNCR charged reagent launcher 104 is positioned between the combustion reaction and a superheater (not shown). According to another embodiment, the charged-induced SNCR charged reagent launcher 104 is positioned downstream from the superheater and upstream from a convective boiler stage (not shown). According to an embodiment, a charged-induced SCR charged reagent launcher 104 is positioned downstream from a superheater (not shown) and upstream from a convective boiler stage (not shown). According to another embodiment, the charged-induced SNCR charged reagent launcher 104 is positioned downstream from a convective boiler stage (not shown) and either upstream or downstream from an economizer (not shown) 203. Positioning of a charge-induced selective nitrogen reduction system, whether SCR or SNCR, can be adjusted according to operating temperatures of the burner system 203, 103.

A counter charge, counter voltage, and/or ground electrode is used to attract the charged reagent. Referring to FIG. 1, in the SNCR embodiment 101, a counter charge is shown as being provided by charging the combustion reaction 108. If surfaces between the combustion reaction 108 and the reagent launcher 104 are insulated or galvanically isolated, combustion reaction charging may similarly be used in SCR embodiment. Referring to FIG. 2, in the SCR embodiment 201, a counter voltage is shown as being provided by a counter electrode 206. The counter electrode 206 can similarly be used in a SNCR embodiment. In a SCR embodiment (not shown) the catalyst bed 204 can be used as a counter electrode. For example, a porous electrode structure (not shown) such as a screen can be embedded in the catalyst bed 204 or placed on a surface of the catalyst bed 204. In applications where the catalyst is conductive (as in a precious metal catalyst), the catalyst surface itself can operate as a counter electrode. Some catalysts operate by providing a free electron to an ammoniacal group. In such cases, applying a positive charge to the reagent and a negative voltage to the catalyst bed can aid in the electron-providing mechanism associated with the catalyst surface.

Referring again to FIGS. 1 and 2, the reagent launcher 104 and the reagent charging apparatus 102 can together form a portion of a furnace, process heater or a boiler system 103. The reagent launcher 104 and the reagent charging apparatus 102 cooperate to cause a reduction in an amount of nitrogen oxide (NOx) species output by the furnace, process heater or the boiler system 103.

The furnace, process heater or a boiler system 103, in addition to the SCR/SNCR system 101, includes a burner 112 configured to support the combustion reaction 108. A fuel and oxidant (e.g., air containing oxygen) is provided to the burner 112.

In an embodiment, the reagent charging apparatus 102 forms a portion of the reagent launcher 104. In another embodiment, the reagent launcher 104 forms a portion of the reagent charging apparatus 102.

The SCR/SNCR system 101 includes a power supply 114 operatively coupled to the reagent charging apparatus 102. The power supply 114 is configured to apply electrical power as a high voltage to the reagent charging apparatus 102. High voltage is defined as a (positive or negative) voltage of 1000 volts or more.

The SCR/SNCR system 101 can include a reagent controller 116 operatively coupled to the reagent launcher 104. Optionally, the reagent controller can be one or more user-adjustable controls. In another embodiment, the reagent controller includes an electronic controller (e.g., a microcontroller, PID controller, networked controller, etc.) configured to select or control reagent control parameters.

Various reagent control parameters can be selected or controlled. For example, the reagent controller 116 can be configured to control a periodicity of reagent launching and/or a flow rate of reagent launched. The reagent controller 116 can be operatively coupled to the power supply 114. The reagent controller 116 can be configured to control the power and/or voltage supplied by the power supply 114 to the reagent charging apparatus 102, a counter electrode, and/or the combustion reaction.

The SCR/SNCR system 101 can include one or more sensors 118 operatively coupled to the reagent controller 116 and/or to the furnace, process heater or boiler system 103. For example, the sensor 118 can measure a parameter that is related to operation of the SCR/SNCR system 101. Examples of such sensors 118 can include a nitric oxide (NO) sensor, a nitrogen dioxide ($NO_2$) sensor, an ammonia ($NH_3$) sensor, an oxygen ($O_2$) sensor, a fuel flow rate sensor, a combustion reaction temperature sensor, a flue gas temperature sensor, a combustion reaction radiation sensor, a voltage sensor, an electric field sensor, and/or a current sensor. In some embodiments, multiple sensor types or sensor positions are used to provide feedback to the reagent controller 116.

For example, a NOx sensor 118 can provide data to the reagent controller indicative of higher-than-desired NOx concentration in the flue gas. The reagent controller 116 can responsively increase the reagent charge density (e.g., by increasing the power supply voltage), increase the reagent flow rate, and/or decrease time between reagent injections. In another example, a temperature sensor 118 can sense temperature of a flue gas or combustion reaction at a reagent injection location. The reagent controller 116 can determine if the temperature exceeds a temperature window for the NOx reduction reaction. If the temperature is too high, the reagent controller can turn off the reagent launcher or reagent flow to the reagent launcher to avoid increasing NOx further.

Alternatively, the reagent controller 116 can change a reagent launch location or trajectory to a cooler location. Other control approaches fall within the scope of this application and will be apparent to one skilled in the art.

In some examples, the reagent charging apparatus 102 and the reagent launcher 104 are configured to cooperate to reduce the amount of NOx output compared to application of an uncharged reagent. In several examples, the reagent charging apparatus 102 and the reagent launcher 104 can be configured to cooperate to reduce an amount of reagent used to reach an amount of NOx reduction compared to application of an uncharged reagent.

According to an embodiment, the reagent charging apparatus 102 is configured to at least intermittently apply positive electrical charge to the reagent. The positive electrical charges applied to the reagent may be selected to form a higher equilibrium concentration of ammonium ions ($NH_4^+$) in the charged reagent compared to an equilibrium concentration of ammonium ions in the uncharged reagent. The higher concentration of ammonium ions may be selected to cooperate with species in the combustion reaction to increase a rate of mass transport of an ammonium or an ammonia species across at least a portion of the combustion reaction 108 compared to a rate of mass transport of an uncharged ammonium or ammonia species. The higher concentration of ammonium ions may be selected to cooperate with NOx molecules to increase a diffusion rate for pairing ammonium ions with NOx molecules compared to an equilibrium concentration of ammonium ions in the uncharged reagent.

According to an embodiment, the reagent charging apparatus 102 is configured to at least intermittently apply negative electrical charges to the reagent. The negative electrical charges applied by the reagent charging apparatus 102 can be selected to induce radicalization of ammonia or urea to form aminyl radicals ($.NH_2$). Aminyl radicals may be considered NOx reduction reaction intermediates. Accordingly, the reagent charging apparatus 102 may be configured to cause an increase in concentration of a SCR/SNCR reaction intermediate compared to an uncharged reagent.

In some examples, the electrical charges applied by the reagent charging apparatus 102 can be configured to increase reactivity of the reagent with NOx molecules in the flue gas 110 compared to an uncharged reagent. In several examples, the electrical charges applied by the reagent charging apparatus 102 can be selected to increase mixing of the reagent with the flue gas 110 compared to an uncharged reagent. In multiple examples, the increased mixing can reduce ammonia slip, reduce NOx output, or reduce both ammonia slip and NOx output compared to application of an uncharged reagent.

In many examples, the SCR/SNCR system 101 can include a combustion reaction charging apparatus 120 configured to apply a voltage or charge to the combustion reaction 108. For example, the charging apparatus 120 can include an electrode supported in contact with the combustion reaction 108. In some examples, the charging apparatus is at least partially coextensive with a fuel nozzle configured to support the combustion reaction 108.

The combustion reaction charging apparatus 120 may be configured to apply to the combustion reaction 108 a voltage or a majority charge having an instantaneous sign opposite of an instantaneous polarity of electrical charges applied by the reagent charging apparatus 102. In some examples, the reagent charging apparatus 102 can be configured to apply a substantially constant charge concentration and polarity to the molecules, aerosol, droplets, or particles of the reagent or the fluid carrying the reagent. In several examples, the reagent charging apparatus 102 may be configured to apply a time-varying charge concentration, a time-varying polarity, or a time-varying charge concentration and polarity to the molecules, aerosol, droplets, or particles of the reagent or the fluid carrying the reagent. When the reagent charging apparatus 102 applies a time varying polarity to the reagent, the combustion reaction charging apparatus 120 can be driven in opposition to the reagent charging apparatus such that the polarity of the combustion reaction and the polarity of the charged reagent are opposite of one another.

The reagent launcher 104 can include a reagent control valve (not shown) configured to control a flow rate of the reagent from a reagent source to a reagent mixer (not shown) or a reagent injector. A reagent mixer may include a Venturi or a length of tube (e.g., a constant cross-section tube) with an orifice configured to meter the nitrogenous compounds into a carrier gas or to mix the reagent with charge carrier particles.

Figure 3:
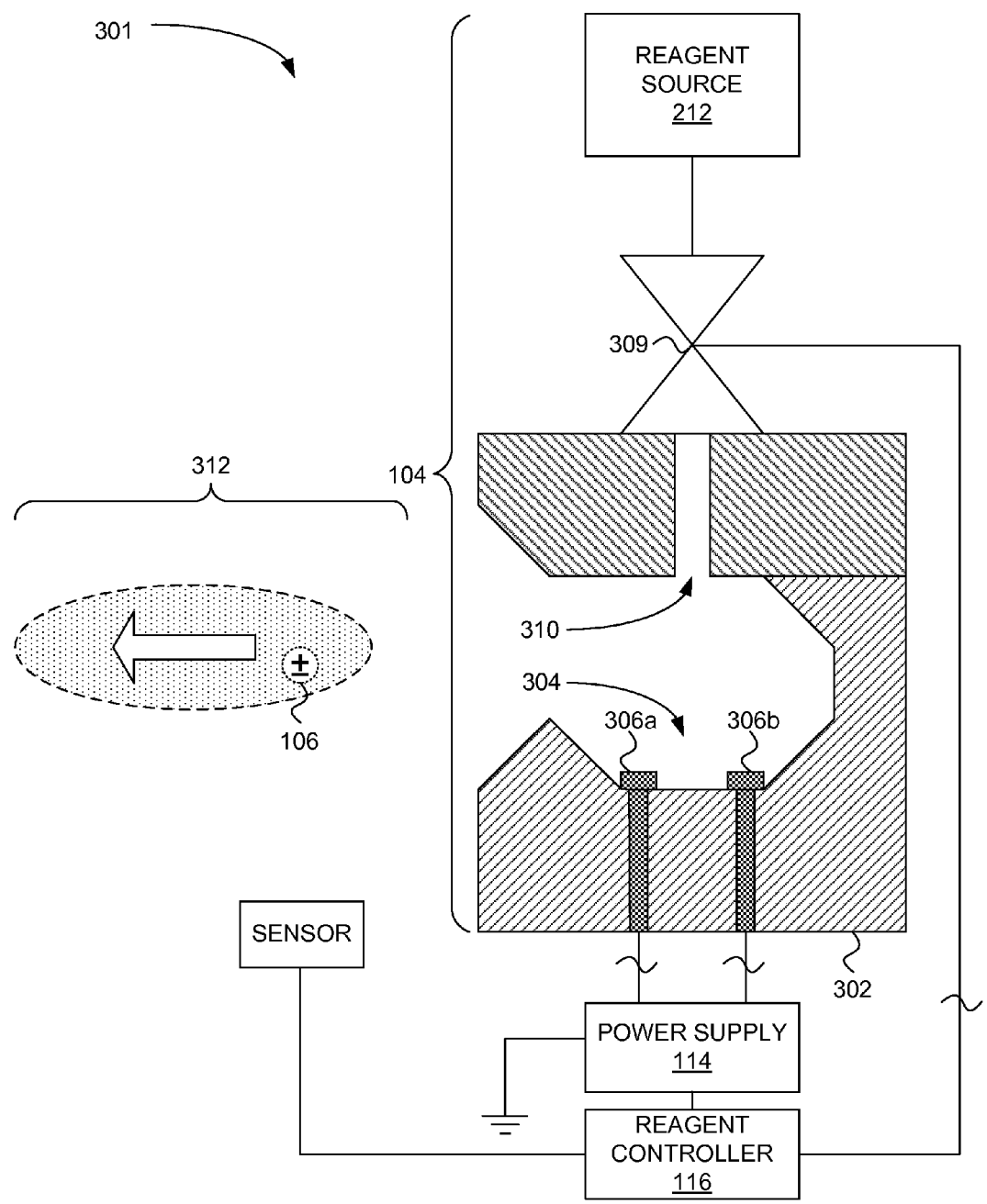
FIG. 3 is a block diagram of an embodiment of a reagent launcher configured to vaporize and charge the reagent.

FIG. 3 is a block diagram of an embodiment 301 of a reagent launcher 104. In various examples, the apparatus 301 may be configured to vaporize and apply a charge to the reagent or a liquid carrying the reagent. In some examples, the reagent launcher 104 can include a body 302 defining a vaporization or atomization chamber 304. The apparatus 301 can include a pair of electrodes 306a and 306b configured to apply a voltage-biased high voltage pulse to the reagent, the reagent-containing droplet, or the liquid carrying the reagent. The apparatus 301 can include a reagent delivery passage 310 configured to deliver the reagent or the liquid carrying the reagent from a reagent source 212 to the vaporization chamber 304. In some examples, the power supply 114 can be configured to apply the voltage-biased high voltage pulse to the pair of electrodes 306a and 306b to cause the reagent or fluid carrying the reagent to vaporize and be ejected as a reagent vapor or aerosol 312 carrying the charged reagent 106.

The apparatus 301 can include a reagent controller 116 operatively coupled to the power supply 114. The apparatus 301 can include a reagent control valve 309 operatively coupled to the reagent source 212, the reagent delivery passage 310, and the reagent controller 116. In some examples, the reagent controller 116 is configured to drive the reagent control valve 309 to admit a quantity of reagent to the vaporization chamber 304 via the reagent delivery passage 310. The reagent controller 116 (if present) is configured to cause the power supply 114 to apply the voltage-biased high voltage pulse to the electrodes 306*a* and 306*b*.

The application of a high voltage pulse to a liquid causes the liquid to vaporize, in some examples without any substantial corresponding increase in liquid temperature. By biasing the high voltage pulse positive or negative, a corresponding charge may be placed on the vaporized liquid. For example, positive bias voltage can be caused by applying a positive voltage on one electrode 306*a* and holding the other electrode 306*b* at ground. Alternatively, a positive bias voltage can be caused by applying a relatively large positive voltage on one electrode 306*a* and applying a negative voltage of lower magnitude on the other electrode 306*b*. The positive bias voltage can cause the reagent vapor or aerosol 312 to carry a net positive charge. The positive charge may tend to be carried by nitrogenous compounds in the reagent.

In some examples, negative bias voltage can be caused by applying a negative voltage on one electrode 306*a* and holding the other electrode 306*b* at ground. Alternatively, a negative bias voltage may be caused by applying a relatively large negative voltage on one electrode 306*a* and applying a positive voltage of lower magnitude on the other electrode 306*b*. The negative bias voltage causes the reagent vapor or aerosol 312 to carry a net negative charge. The negative charge may tend to be carried by the reagent.

The electrodes optionally can be configured to carry reversed combinations of positive, negative, and ground pulses, as applicable. The reagent source 212 may hold a pressurized liquid such as a water solution of dissolved ammonia. Alternatively, the reagent source 212 may be configured to hold the reagent in the form of a solid dispersed in a liquid, for example, a urea slurry. Alternatively, the reagent source 212 may be configured to hold anhydrous ammonia.

FIG. 4 is a block diagram of an embodiment 401 of a reagent launcher 104. The apparatus 401 is configured to meter the reagent into a dielectric gas. The apparatus 401 is configured to entrain the reagent in the dielectric gas to form a gas-entrained reagent 403. The apparatus 401 is configured to eject a charge into the dielectric gas. The apparatus 401 may be configured to deposit the charge from the dielectric gas onto the gas-entrained reagent 403.

The apparatus 401 may be configured to eject a stream, a pulse, or a cloud of the gas-entrained reagent 403. In some examples, the reagent launcher 104 can include a body 402 defining a gas flow passage 404 in communication with a gas source and a region proximate to the flue gas 110 produced by the combustion reaction 108. The apparatus 401 includes a reagent meter 410 configured to meter the reagent into a gas 408 passing through the gas flow passage 404 to form the gas-entrained reagent composition 403. The reagent charging apparatus can include at least one corona electrode 414 configured to create a charge concentration in the gas 408 passing through the gas flow passage 404 for depositing the charge on the metered reagent entrained in the gas passing through the gas flow passage. The charges ejected by the corona electrode 414 may be deposited substantially completely on the reagent. Alternatively, charge carrier particles can be combined with the reagent, and the charges may be deposited on the charge carrier particles.

The reagent launcher 104 includes a reagent control valve 412 configured to control the supply of the reagent to the reagent meter 410. The reagent controller 116 may be operatively coupled to and configured to control the operation of the reagent control valve 412. A power supply 114 is operatively coupled to the corona electrode 414.

FIG. 5 is a block diagram of another embodiment 501 of a reagent launcher 104. The apparatus 501 is configured to eject a stream, a pulse, or spray of a liquid 503 carrying a voltage or a charge and the reagent. In some examples, the apparatus 501 can be configured to eject the stream, the pulse, or the spray of liquid 503 carrying the charged reagent 106. The reagent launcher 104 includes a nozzle 502 configured to eject the stream, the pulse, or the spray including the reagent 106. The reagent charging apparatus 102 can be substantially coextensive with the nozzle 502 or the reagent charging apparatus 102 can be operatively coupled to the nozzle 502. A power supply 114 is operatively coupled to the reagent charging apparatus 102 and configured to cause the reagent charging apparatus 102 to apply the charge to the reagent.

In numerous examples of the apparatus 501, the power supply 114 can be operatively coupled to a combustion reaction charging apparatus 120 and/or to an attraction electrode (see, e.g., FIG. 2, 206). In various examples, the apparatus 501 includes a reagent control valve 504 operatively coupled to the nozzle 502. The reagent control valve 504 can be configured to control the flow of the reagent. In some examples, the apparatus 501 includes a reagent controller 116 operatively coupled to the reagent control valve 504. The reagent controller 116 can be configured to cause the reagent control valve 504 to control the flow of the reagent.

In many examples, the apparatus 501 includes a reagent supply subsystem 506. The reagent supply subsystem 506 can include a reagent tank 508 operatively coupled to the nozzle 502. The reagent tank 508 can be configured to hold a liquid vehicle for carrying the reagent or a liquid reagent 510. In some examples, one or more electrical isolators 512 can be operatively coupled to the reagent tank 508. The electrical isolators 512 can be configured to maintain the reagent tank and the liquid vehicle for carrying the reagent or a liquid reagent 510 in electrical isolation from voltages or ground other than voltages or ground conveyed from a voltage source 114. The apparatus 501 can further include a dielectric gap 514 formed between a reagent source 516 and the liquid vehicle for carrying the reagent or the liquid reagent 510. In some examples, the apparatus 501 can further include at least a portion of the reagent source 516.

In addition to or in alternative to galvanic isolation of the liquid reagent tank 508, the liquid can be selected or treated to have low electrical conductivity. Galvanic isolation of such a liquid can include a relatively long non-conductive pipe having a length selected to limit or eliminate conduction through the liquid.

FIG. 6 is a block diagram of another embodiment 601 of a reagent launcher 104 configured to output a gaseous reagent or a gas carrying the reagent. The reagent launcher 104 includes a gas nozzle 604 configured to output the gaseous reagent into the flue gas 110. The reagent charging apparatus 102 (shown in FIG. 1) may further include an ionizer 606 configured to cause charge ejection into the gaseous reagent. A gaseous reagent supply 602 can be operatively coupled to the gas nozzle 604 and the ionizer 606. The apparatus 601 can include reagent supply valve 608 operatively coupled to the reagent supply 602 and the gas nozzle 604.

A reagent controller 116 can be operatively coupled to the reagent supply valve 608 and configured to cause the reagent supply valve 608 to control a flow rate of, or a periodicity of providing, the gaseous reagent from the reagent supply 602 to the gas nozzle 604. A power supply 114 is operatively coupled to at least the ionizer 606 and can be configured to cooperate with the ionizer 606 to eject the charges into the gaseous reagent.

The system 103, 203 can be configured to output heat from the combustion reaction. A subsystem (not shown) configured to receive heat from the combustion reaction can include an industrial process, a gas turbine, a process material, a boiler, a furnace, a process heater, a prime mover, a power generation system, a commercial heating system, a commercial cooking system, or a commercial or residential hot water system, for example.

FIG. 7 is a flow chart that shows a method 701 for operating a nitrogen oxide (NOx) control system, according to an embodiment. In various examples, the method 701 includes an operation 702 of applying first electrical charges to a SCR/SNCR reagent. The method 701 can include an operation 704 of contacting the charged reagent into a combustion reaction or a combustion gas from a combustion reaction. The method 701 can include an operation 706 wherein the electrical charge can be selected to enhance mixing of the SCNR reagent with NOx or to enhance NOx reactivity of the reagent with NOx. The method 701 can include an operation 708 to reduce the NOx to molecular nitrogen ($N_2$).

In some examples of the operation 702, applying first electrical charges to the SCR/SNCR reagent can include applying first electrical charges to urea, ammonia, a solution including urea, or a solution including ammonia. In further examples of the method 701, operation 702 can include applying first electrical charges to the SCR/SNCR reagent composition by operating a reagent charging apparatus. In multiple examples, operation 702 can include operating a power supply to apply electricity to the reagent charging apparatus.

In various examples of the method 701, the operation 704 for injecting the charged reagent into a combustion reaction or a combustion gas from the combustion reaction includes include operating a reagent launcher. In some examples, the method 701 can include (not shown) operating a reagent controller to control a periodicity or a rate of reagent injected into the combustion reaction or the combustion gas from the combustion reaction.

In several examples, the method 701 includes include (not shown) operating at least one sensor. In many examples, the method 701 may include operating the reagent controller responsive to a signal from the at least one sensor. In numerous examples, operating the at least one sensor includes operating a NO sensor. In various examples, operating the at least one sensor includes operating a $NO_2$ sensor. In some examples, operating the at least one sensor includes operating an ammonia sensor. In several examples, operating the at least one sensor includes operating an oxygen sensor. In many examples, operating the at least one sensor includes operating a combustion fluid flow rate sensor. In multiple examples, operating the at least one sensor includes operating a combustion reaction temperature sensor. In numerous examples, operating the at least one sensor includes operating a combustion reaction radiation sensor. In further examples, operating the at least one sensor includes operating a voltage sensor. In various examples, operating the at least one sensor includes operating an electric field sensor. In some examples, operating the at least one sensor includes operating a current sensor.

Figure 4:
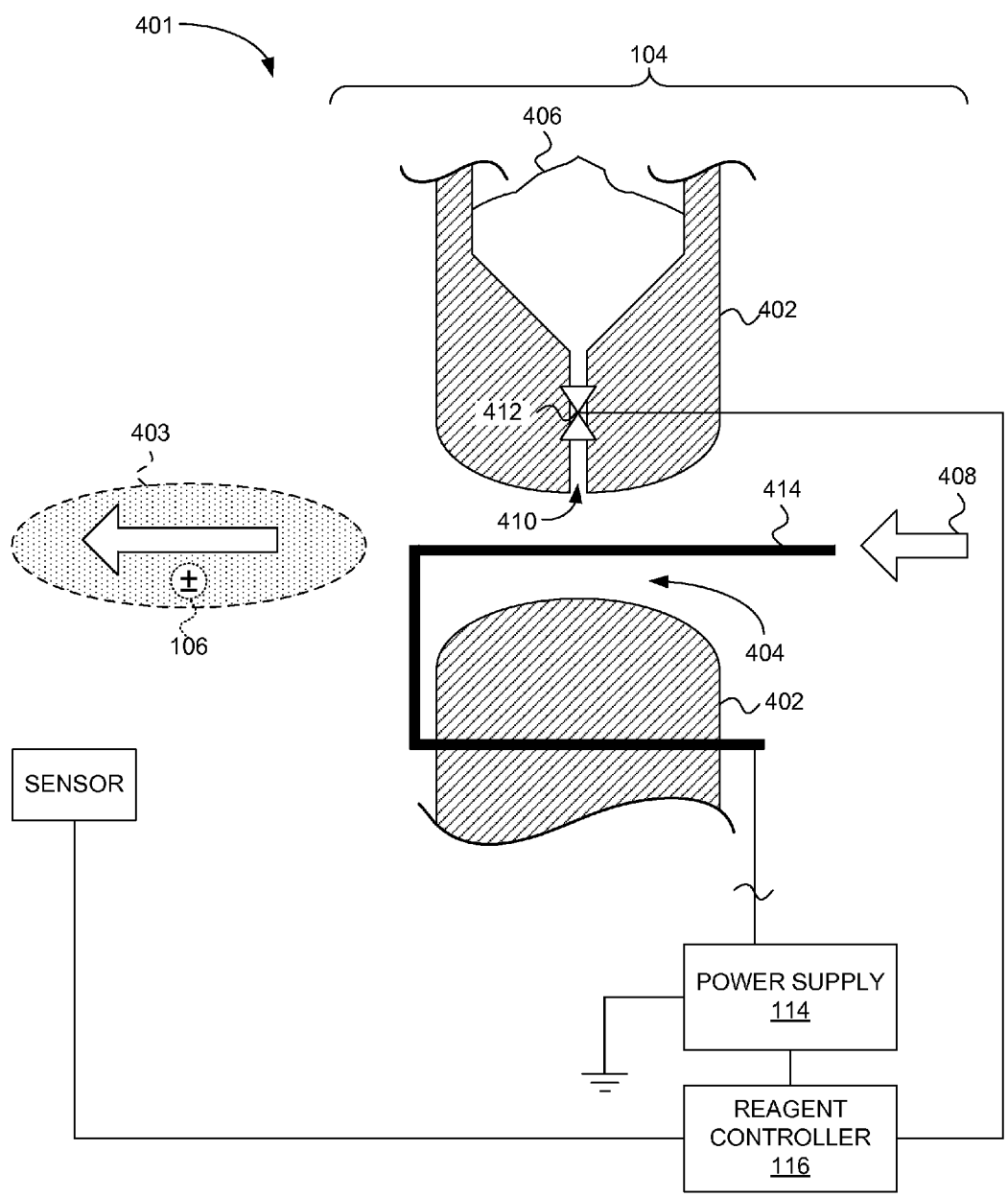
FIG. 4 is a block diagram of an embodiment of a reagent launcher configured to entrain the reagent in the dielectric gas to form a gas-entrained reagent.
Figure 5:
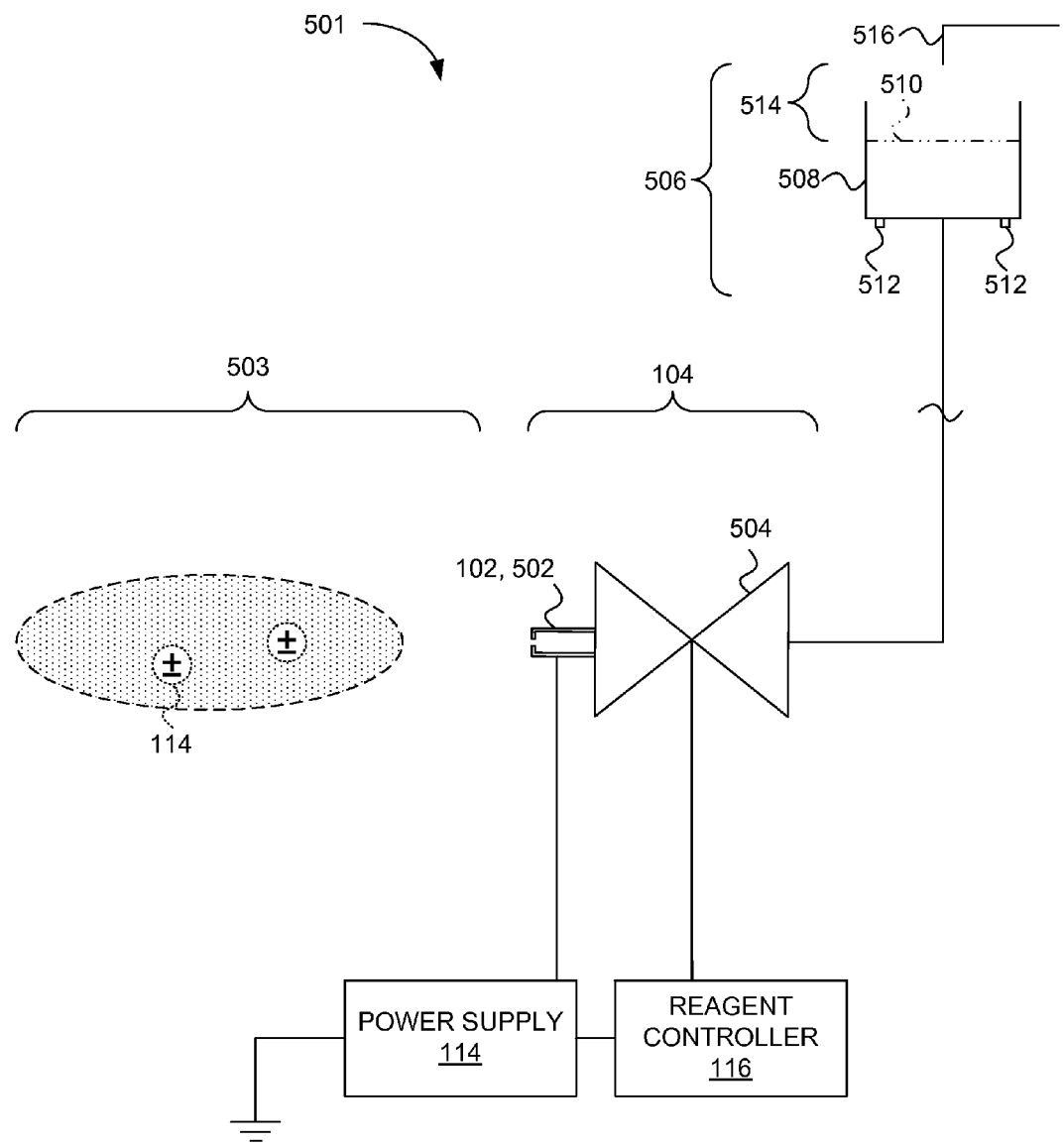
FIG. 5 is a block diagram of an embodiment of a reagent launcher configured to eject a stream, a pulse, or a spray of the reagent carrying a voltage or charge.
Figure 6:
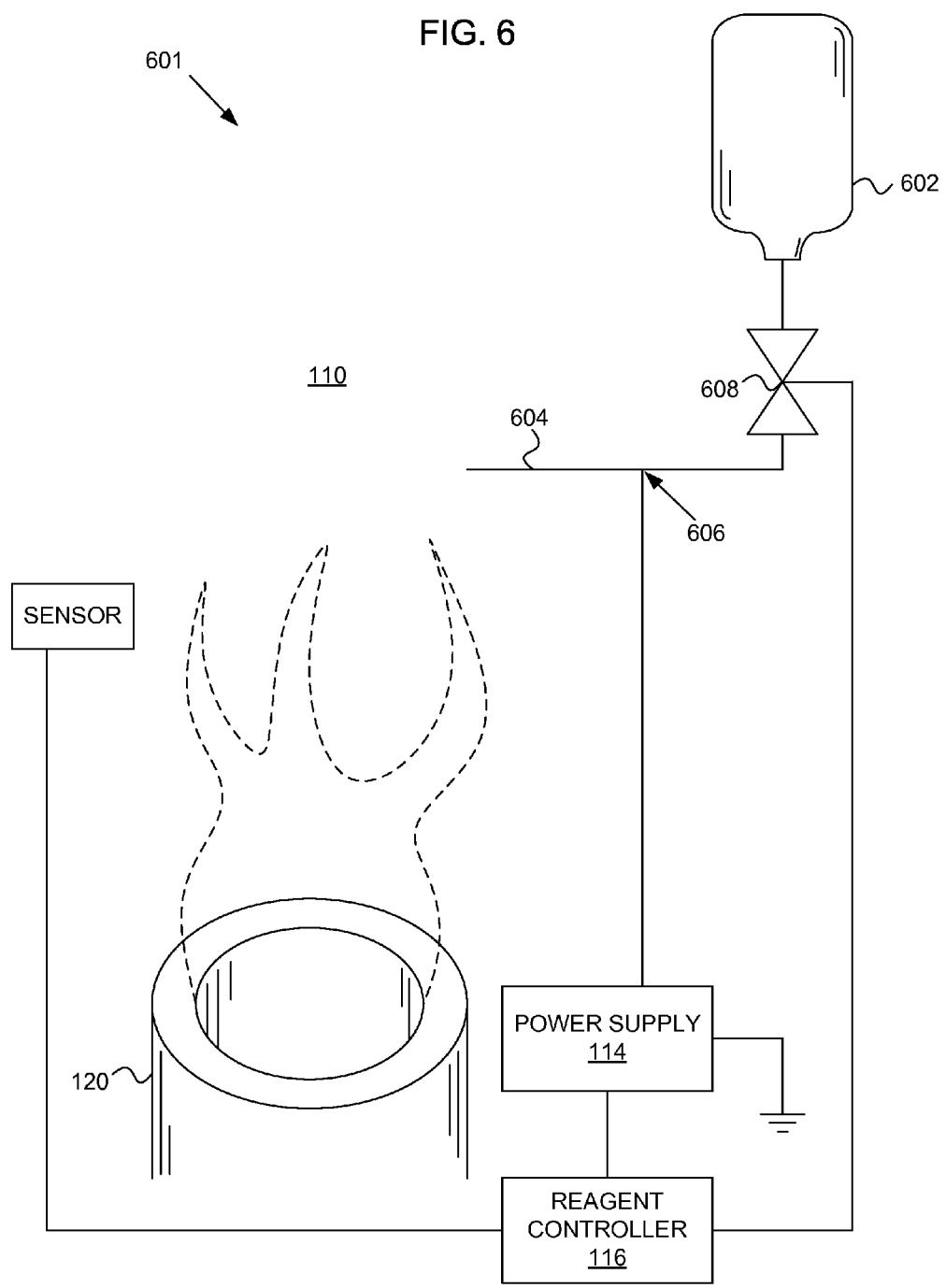
FIG. 6 is a block diagram of an embodiment of a reagent launcher configured to output the reagent in the form of a gas phase reagent.

Referring to FIG. 7 and to FIG. 3, operating the reagent launcher 104 can include operating the apparatus 301 configured to vaporize and apply a charge to the reagent or a liquid carrying the reagent. Referring to FIG. 7 and to FIG. 4, operating the reagent launcher 104 can include operating the apparatus 401 configured to meter the reagent into a dielectric gas. In many examples, operating the reagent launcher 104 can include entraining the reagent in the dielectric gas. Operating the reagent launcher 104 can include ejecting a charge into the dielectric gas. In further examples, operating the reagent launcher 104 can include depositing the charge from the dielectric gas onto the entrained reagent. Referring to FIG. 7 and to FIG. 5, operating the reagent launcher 104 can include operating an apparatus 501 configured eject a stream, a pulse, or a spray of a liquid 503 carrying a voltage or a charge and including the reagent. Referring to FIG. 7 and to FIG. 6, operating the reagent launcher can include operating an apparatus 601 configured to output a gaseous reagent or a gas carrying the reagent.

Referring to FIG. 7, the operation 702 for applying the first electrical charges to the SCR/SNCR reagent and the operation 704 for injecting the charged reagent into a combustion reaction or a combustion gas from a combustion reaction can include operating a reagent charging apparatus and a reagent launcher that are at least partially coextensive.

In multiple examples, applying the first electrical charges to the SCR/SNCR reagent includes applying a voltage include applying electricity to the reagent. In some examples, applying the first electrical charges to the SCR/SNCR reagent can include applying a time-varying charge to the reagent. In further examples, applying a time-varying charge to the SCR/SNCR reagent can include applying a sequence of positive and negative charges to the reagent. In other examples, applying a time-varying charge to the SCR/SNCR reagent can include applying a pulsed charge of a single sign to the reagent. In some examples, applying a charge to the SCR/SNCR reagent can include applying a charge of a single polarity to the reagent. In several examples, charging the SCR/SNCR reagent can include applying a positive voltage to the reagent.

In some examples, charging the SCR/SNCR reagent includes applying a negative charge to the SCNR regent. Where the SCNR reagent composition includes ammonia or urea, the method 701 can include forming amide ($NH_2$—) ions from the ammonia or the urea. In further examples, the method 701 can include decomposing the amide ions to aminyl radicals ($.NH_2$) after injecting the charged reagent. In several examples, the operation 708 for reducing the NOx to molecular nitrogen includes reacting the aminyl radicals with nitric oxide to produce molecular nitrogen and water.

In several examples, operation 706 for enhancing reactivity of the reagent with NOx to operation 708 for reducing the NOx to molecular nitrogen can include causing reagent charging selected to increase a rate of reaction.

In many examples, operation 706 for enhancing reactivity of the reagent with NOx and operation 708 for reducing the NOx to molecular nitrogen can include causing reagent charging selected to decrease an average distance between the charged reagent molecules and NOx molecules.

In many examples, operation 706 for enhancing reactivity of the reagent with NOx to operation 708 for reducing the NOx to molecular nitrogen can include causing the reagent to adopt an activated form selected to increase attraction between the activated form of the reagent and NO.

In embodiments, the method 701 includes operation 712 of supporting the combustion reaction. The method 701 can include operation 710 for providing a fuel to support the combustion reaction. The operation of providing a fuel may include providing a hydrocarbon gas, a hydrocarbon liquid, or powdered coal, for example.

In some examples, the method 701 includes an operation 714 of applying second electrical charges or a second voltage to the combustion reaction. The second electrical charges or voltage are opposite in polarity from the first electrical charges. Applying a second voltage to the combustion reaction can include operating the combustion reaction charging apparatus such as a charge electrode. The charge electrode may be at least partially coextensive with a burner configured to support the combustion reaction. The second voltage is opposite in sign from the first electrical charges. Alternatively, the operation 714 can include applying a second voltage and/or a ground potential to an attraction electrode. The attraction electrode can be positioned to draw the charged reagent across a flue or to a SCR catalyst bed.

In an embodiment, applying the first electrical charges to the reagent and applying the second voltage to the combustion reaction or the attraction electrode can include synchronously applying opposite polarity time-varying electrical charges and/or voltages.

The method 701 can include decreasing NOx produced by the combustion reaction for a given heat output or decreasing an amount of the SCR/SNCR reagent usage for a given amount of NOx reduction compared to injecting non-charged SCR/SNCR reagent, for a given heat output.

The method 701 can include applying heat from the combustion reaction to an industrial process, a gas turbine, a process material, a boiler, a furnace, power generation system, a prime mover, a commercial heating system, or to a commercial or residential hot water system, for example.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A selective nitrogen oxide (NOx) reduction system for a combustion reaction device, the system comprising:
    a reagent charging apparatus configured to apply electrical charges to a selective nitrogen oxide reduction reagent, the reagent further comprising a SCR/SNCR reagent; and
    a reagent launcher configured to launch the charged reagent into a flue gas produced by a combustion reaction; the reagent launcher further comprising:
        a body defining a chamber, a launch orifice configured to eject reagent, and a reagent delivery passage configured to deliver the reagent or fluid carrying the reagent from a reagent source to the chamber; and
        at least one electrode, distinct from the body defining the chamber, disposed at least partially within the chamber, within the launch orifice or within the delivery passage;
    wherein the at least one electrode is operatively coupled to the reagent charging apparatus.

2. The selective NOx reduction system of claim 1, wherein the reagent launcher and reagent charging apparatus form a portion of a burner or boiler system and cooperate to cause a reduction in an amount of NOx output by the burner or boiler system.

3. The selective NOx reduction system of claim 1, further comprising a burner configured to provide a fuel or a fuel and oxidizer to support the combustion reaction.

4. The selective NOx reduction system of claim 1, wherein the reagent charging apparatus forms a portion of the reagent launcher.

5. The selective NOx reduction system of claim 1, wherein the reagent launcher forms a portion of the reagent charging apparatus.

6. The selective NOx reduction system of claim 1, further comprising:
    a power supply operatively coupled to the reagent charging apparatus and configured to apply electricity to the reagent charging apparatus.

7. The selective NOx reduction system of claim 1, further comprising:
    a reagent controller operatively coupled to the reagent launcher and configured to control a periodicity or a rate of reagent launched.

8. The selective NOx reduction system of claim 7, further comprising:
    a power supply operatively coupled to the reagent charging apparatus and configured to apply electricity to the reagent charging apparatus;
    wherein the reagent controller is operatively coupled to the power supply and configured to control the electricity applied by the power supply to the reagent charging apparatus.

9. The selective NOx reduction system of claim 7, further comprising:
    at least one sensor operatively coupled to the reagent controller; wherein the reagent controller is configured to control the periodicity or rate of reagent launched responsive to a sensor signal received from the at least one sensor.

10. The selective NOx reduction system of claim 1, wherein the reagent charging apparatus is configured to at least intermittently apply positive electrical charges to the reagent.

11. The selective NOx reduction system of claim 10, wherein the positive electrical charges applied to the reagent are selected form a higher concentration of ammonium ions ($NH_4^+$) in the charged reagent than an equilibrium concentration of ammonium ions in the uncharged reagent.

12. The selective NOx reduction system of claim 1, wherein the reagent charging apparatus is configured at least intermittently apply negative electrical charges to the reagent.

13. The selective NOx reduction system of claim 1, wherein the reagent includes ammonia or urea; and
    wherein the electrical charges applied by the reagent charging apparatus are configured to induce radicalization of ammonia or urea to form an $\cdot NH_2$ radical.

14. The selective NOx reduction system of claim 1, wherein the electrical charges applied by the reagent charging apparatus are configured to increase reactivity of the reagent with NOx molecules in the flue gas compared to an uncharged reagent.

15. The selective NOx reduction system of claim 1, wherein the electrical charges applied by the reagent charging apparatus are configured to increase mixing of the reagent with the flue gas compared to an uncharged reagent.

16. The selective NOx reduction system of claim 1, further comprising:
a combustion reaction charging apparatus configured to apply a voltage or charge to the combustion reaction.

17. The selective NOx reduction system of claim 16, wherein the combustion reaction charging apparatus is configured to apply, to the combustion reaction, a voltage or majority charge having an instantaneous polarity opposite to an instantaneous polarity of the electrical charges carried by the reagent.

18. The selective NOx reduction system of claim 1, wherein the reagent charging apparatus is configured to apply a substantially constant charge concentration and sign to the reagent.

19. The selective NOx reduction system of claim 1, wherein the reagent charging apparatus is configured to apply a time-varying charge concentration, a time-varying charge polarity, or a time-varying charge concentration and polarity to the reagent.

20. The selective NOx reduction system of claim 1, further comprising:
an attraction electrode configured to be held at a voltage opposite in polarity to the reagent charge, and to draw the reagent across a flue or toward a catalyst.

21. The selective NOx reduction system of claim 1, further comprising:
a catalyst bed.

22. The selective NOx reduction system of claim 21, further comprising:
a power supply operatively coupled to the catalyst bed and configured to apply a voltage opposite in polarity to the reagent charge to the catalyst bed.

23. The selective NOx reduction system of claim 22, wherein a catalyst in the catalyst bed includes an electrical conductor; and
wherein the power supply is configured to apply the voltage to the catalyst.

24. The selective NOx reduction system of claim 23, further comprising:
wherein the voltage applied to the catalyst by the power supply is negative polarity; and
wherein the negative polarity applied to the catalyst is selected to increase a supply of electrons to a reaction intermediate.

25. The selective NOx reduction system of claim 1, wherein the reagent launcher further comprises:
an apparatus configured to vaporize and apply a charge to the reagent or a liquid carrying the reagent.

26. The selective NOx reduction system of claim 1, further comprising:
a reagent controller operatively coupled to a power supply; and
a reagent supply valve operatively coupled to the reagent source, the reagent delivery passage, and a reagent controller;
wherein the reagent controller is configured to drive the reagent supply valve to admit a quantity of reagent to a vaporization chamber via the reagent delivery passage, and cause the power supply to apply a voltage-biased high voltage pulse to the electrodes.

27. The selective NOx reduction system of claim 1, wherein the reagent launcher further comprises:
an apparatus configured to meter the reagent into a dielectric gas, entrain the reagent in the dielectric gas, eject a charge into the dielectric gas, and deposit the charge from the dielectric gas onto the entrained reagent.

28. The selective NOx reduction system of claim 27, wherein the apparatus is configured to eject a stream, pulse, or cloud of gas-entrained reagent.

29. The selective NOx reduction system of claim 1, wherein the reagent launcher 104 further comprises:
a body defining a gas flow passage in communication with a gas source and the flue gas produced by the combustion reaction; and
a reagent meter configured to meter the reagent into a gas passing through the gas flow passage;
wherein the reagent charger further comprises at least one charge ejecting electrode configured to create a charge concentration in the gas passing through the gas flow passage for depositing the charge on the metered reagent entrained in the gas passing through the gas flow passage.

30. The selective NOx reduction system of claim 29, wherein the reagent launcher further comprises:
a reagent control valve configured to control a supply of reagent to the reagent meter; and
a reagent controller operatively coupled to the reagent control valve and configured to control operation of the reagent control valve.

31. The selective NOx reduction system of claim 1, wherein the reagent launcher further comprises a nozzle configured to eject a stream, pulse, or spray including the reagent.

32. The selective NOx reduction system of claim 31, wherein the reagent charging apparatus is substantially coextensive with at least a portion of the nozzle.

33. The selective NOx reduction system of claim 31, further comprising:
a power supply operatively coupled to the reagent charging apparatus and configured to cause the reagent charging apparatus to apply the charge to the reagent;
wherein the reagent charging apparatus is operatively coupled to the nozzle.

34. The selective NOx reduction system of claim 33, wherein the power supply is also operatively coupled to a combustion reaction charging apparatus.

35. The selective NOx reduction system of claim 31, further comprising:
a reagent control valve operatively coupled to the nozzle and configured to control flow of the reagent; and
a reagent controller operatively coupled to the reagent control valve and configured to cause the reagent control valve to control flow of the reagent.

36. The selective NOx reduction system of claim 31, further comprising:
a reagent supply subsystem, the reagent supply subsystem further comprising:
a reagent tank operatively coupled to the nozzle and configured to hold a liquid reagent;
electrical isolators operatively coupled to the reagent tank and configured to maintain the reagent tank and the liquid reagent in galvanic isolation from voltages or ground other than voltages or ground conveyed from a power supply; and
a dielectric gap formed between a reagent source and the reagent tank.

37. The selective NOx reduction system of claim 1, wherein the reagent launcher further comprises:
a gas nozzle configured to output a gaseous reagent into the flue gas; and wherein the reagent charging apparatus further comprises:
an ionizer configured to cause charge ejection into the gaseous reagent.

38. The selective NOx reduction system of claim 1:
wherein the at least one electrode further comprises a pair of electrodes configured to apply a voltage-biased high voltage pulse to the reagent or the fluid carrying the reagent, within the chamber; and
wherein the power supply is configured to apply a voltage-biased high voltage pulse across a pair of the electrodes to cause the reagent or fluid carrying the reagent to vaporize and be ejected as a reagent vapor or aerosol carrying the charged reagent.

39. The selective NOx reduction system of claim 1,
wherein the chamber is a reagent vaporization chamber.

40. The selective NOx reduction system of claim 1,
wherein the launch orifice further comprises a venturi.

41. The selective NOx reduction system of claim 40,
wherein the delivery passage is disposed within the venturi launch orifice.

42. The selective NOx reduction system of claim 40,
wherein the at least one electrode further comprises a corona electrode disposed within the venturi launch orifice.

43. A method for operating a nitrogen oxide (NOx) control system for combustion, comprising:
delivering a reagent through a delivery passage to a chamber inside a body, the reagent further comprising a selective nitrogen reduction SCR/SNCR reagent;
applying first electrical charges to the reagent by applying the first electrical charges to at least one electrode, the electrode being distinct from the body defining the chamber and being disposed at least partially within the chamber, within a launch orifice of the chamber or within the delivery passage; and
injecting the charged reagent, via the launch orifice of the chamber, into a flue gas resulting from a combustion reaction;
wherein the first electrical charges are selected to enhance mixing of the reagent with NOx or to enhance reactivity of the reagent with NOx to reduce the NOx to molecular nitrogen ($N_2$).

44. The method for operating the nitrogen oxide (NOx) control system of claim 43, wherein applying first electrical charges to the reagent includes applying first electrical charges to urea, ammonia, a solution including urea, or a solution including ammonia.

45. The method for operating the nitrogen oxide (NOx) control system of claim 43, wherein applying the first electrical charges to the reagent includes operating a reagent charging apparatus.

46. The method for operating the nitrogen oxide (NOx) control system of claim 45, further comprising:
operating a power supply to apply electricity to the reagent charging apparatus.

47. The method for operating the nitrogen oxide (NOx) control system of claim 43, wherein injecting the charged reagent includes operating a reagent launcher, the reagent launcher further comprising the body, the electrode, the delivery passage, and the launch orifice.

48. The method for operating the nitrogen oxide (NOx) control system of claim 47, further comprising:
operating a reagent controller to control a periodicity or a rate of reagent injected into the flue gas.

49. The method for operating the nitrogen oxide (NOx) control system of claim 48, further comprising:
operating at least one sensor;
wherein operating the reagent controller includes operating the reagent controller responsive to a signal from the at least one sensor.

50. The method for operating the nitrogen oxide (NOx) control system of claim 47, wherein the chamber is a reagent vaporization chamber and the step of applying first electrical charges includes vaporizing the reagent or a liquid carrying the reagent.

51. The method for operating the nitrogen oxide (NOx) control system of claim 47, wherein operating the reagent launcher includes operating an apparatus configured to meter the reagent into a dielectric gas, entrain the reagent in the dielectric gas, eject a charge into the dielectric gas, and deposit the charge from the dielectric gas onto the entrained reagent.

52. The method for operating the nitrogen oxide (NOx) control system of claim 47, wherein operating the reagent launcher includes operating an apparatus configured to eject a stream, pulse, or spray of liquid carrying a voltage or charge and including the reagent.

53. The method for operating the nitrogen oxide (NOx) control system of claim 47, wherein operating the reagent launcher includes operating an apparatus configured to output a gaseous reagent or a gas carrying the reagent.

54. The method for operating the nitrogen oxide (NOx) control system of claim 47, further comprising:
applying a voltage to an attraction electrode opposite in polarity to the first electrical charges.

55. The method for operating the nitrogen oxide (NOx) control system of claim 43, wherein applying the first electrical charges to the SCR/SNCR reagent includes applying a time-varying charge to the reagent.

56. The method for operating the nitrogen oxide (NOx) control system of claim 55, wherein applying a charge to the SCR/SNCR reagent includes applying a positive voltage to the regent.

57. The method for operating the nitrogen oxide (NOx) control system of claim 56, further comprising:
forming ammonium ions ($NH_4$+) from the reagent.

58. The method for operating the nitrogen oxide (NOx) control system of claim 57, further comprising:
after injecting the charged reagent, decomposing the ammonium ions to an $\cdot NH_2$ radical;
wherein reducing the NOx to $N_2$ includes reacting the $\cdot NH_2$ radical with nitrogen monoxide (NO) to produce $N_2$ and $H_2O$.

59. The method for operating the nitrogen oxide (NOx) control system of claim 55, wherein applying a charge to the SCR/SNCR reagent includes applying a negative charge to the regent.

60. The method for operating the nitrogen oxide (NOx) control system of claim 59, further comprising:
forming $NH_2$—ions from the reagent.

61. The method for operating the nitrogen oxide (NOx) control system of claim 60, further comprising:
after injecting the charged reagent, decomposing the $NH_2$—ions to $\cdot NH_2$ radicals;
wherein reducing the NOx to $N_2$ includes reacting the $\cdot NH_2$ radical with nitrogen monoxide (NO) to produce $N_2$ and $H_2O$.

62. The method for operating the nitrogen oxide (NOx) control system of claim 43, further comprising:
supporting the combustion reaction.

63. The method for operating the nitrogen oxide (NOx) control system of claim 43, further comprising:
applying second electrical charges to the combustion reaction.

64. The method for operating the nitrogen oxide (NOx) control system of claim 63, wherein the second electrical charges are opposite in sign from the first electrical charges.

65. The method for operating the nitrogen oxide (NOx) control system of claim 63, wherein the second charges are opposite in sign from the first electrical charges.

66. The method for operating the nitrogen oxide (NOx) control system of claim 63, wherein applying the first electrical charges to the reagent and applying a second voltage to the combustion reaction include synchronously applying time-varying electrical charges and voltage, respectively.

67. The method for operating the nitrogen oxide (NOx) control system of claim 43, further comprising:
applying heat from the combustion reaction to an industrial process, a gas turbine, a process material, a boiler, a furnace, a power generation system, a commercial heating system, a commercial cooking system, or a commercial or residential hot water system.

68. The method for operating the nitrogen oxide (NOx) control system of claim 43,
wherein the at least one electrode further comprises a pair of electrodes, and
wherein the step of applying first electrical charges further comprises applying a voltage-biased high voltage pulse to the reagent or a fluid carrying the reagent across the pair of electrodes to cause the reagent or the fluid carrying the reagent to vaporize and be ejected as a reagent vapor or aerosol carrying the charged reagent.

69. The method for operating the nitrogen oxide (NOx) control system of claim 43, wherein the chamber is a reagent vaporization chamber and further including a step of vaporizing the reagent.

70. The method for operating the nitrogen oxide (NOx) control system of claim 43, wherein the launch orifice further comprises a venturi.

71. The method for operating the nitrogen oxide (NOx) control system of claim 70, wherein the delivery passage is disposed within the venturi of the launch orifice.

72. The method for operating the nitrogen oxide (NOx) control system of claim 70, wherein the at least one electrode further comprises a corona electrode disposed within the venturi launch orifice.

* * * * *